June 11, 1929.   A. M. R. KARLSTRÖM   1,717,223

METHOD AND APPARATUS FOR RECOVERY OF FIBERS FROM LIQUIDS

Filed Aug. 23, 1927

INVENTOR.

Adolf M. R. Karlström

By William C. Linton

Atty.

Patented June 11, 1929.

1,717,223

UNITED STATES PATENT OFFICE.

ADOLF MAGNUS RUPERT KARLSTRÖM, OF HYLTEBRUK, SWEDEN.

METHOD AND APPARATUS FOR RECOVERY OF FIBERS FROM LIQUIDS.

Application filed August 23, 1927, Serial No. 214,949, and in Sweden September 7, 1926.

The present invention relates to methods and apparatus for the recovery of fibers from liquids containing fibers and has for its principal object the recovery of fibers from waste or back-water from cellulose, paper and wood-grinding mills.

The recovery of paper-pulp fibers from the back-water has been effected, for instance, by deposition tanks or so called funnel filters, into which the back-water is introduced. In this apparatus the back-water is supplied from above and the purpose is that the fibers might sink to the bottom while clarified water runs off at the top of the tank or funnel. This method is suitable only when the fibers are heavy by some loading material. In opposite case a great portion of the fibers will rise instead of sinking down in the tank. The reason of this fact is the air bubbles adhering to the fibers.

Also other prior methods to recover the fibers from the back-water have not given satisfactory results.

The present invention enables the recovery of the fibers by a method consisting therein that the liquid containing fibers and mixed with air or gas is introduced into a tank so that the fibers with the aid of air or gas bubbles are lifted up and collected in the upper portion of the tank, while the clarified water is discharged from the lower portion of the tank. In order to hasten the upward movement of the fibers, the liquid is sucked up into the tank whereby the air or gas bubbles get an increased power to rise. In the upper portion of the tank the fibers certainly let off a great portion of the gas or air but are prevented from sinking down by so to speak loaded fibers pressing on from below.

In many cases the waste or back-water, when it leaves the work-place, is sufficiently mixed with air to enable a direct treatment of the liquid. In opposite case air or gas easily can be introduced.

In the manufacture of paper sized by resin, a considerable quantity of resin in finely-divided state escapes with the backwater. As the air bubbles show a great tendency to adhere to these resin particles the latter will accompany the fibers and accelerate the rising movement thereof. The resin particles are recovered with the fibers whereby a considerable saving of resin is attained.

Figure 1:
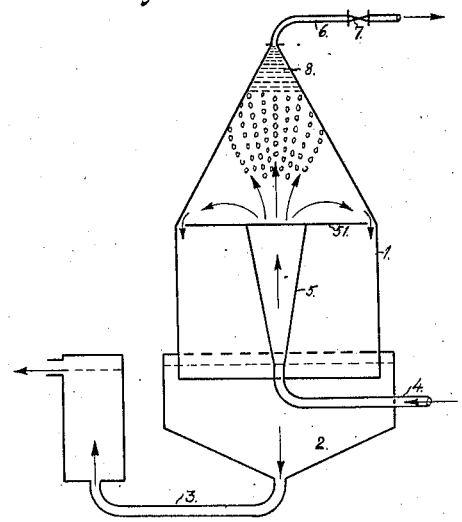
Figure 2:
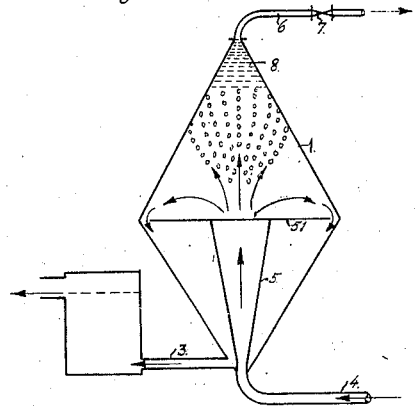
Figure 3:
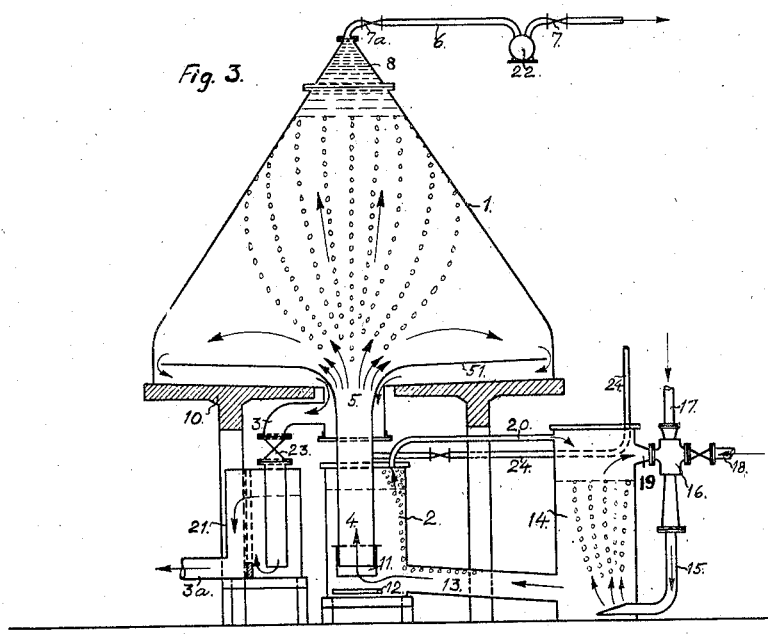

Some embodiments of an apparatus for the carrying out of the present method are illustrated in the accompanying drawing in which Figures 1, 2 and 3 show each an embodiment.

With reference to Figure 1, 1 denotes a tank which is open in the bottom and tapers upwardly. The lower end of the tank projects down into an open vat or reservoir 2 to the bottom of which a discharge conduit 3 is connected. In the centre of the tank there enters an inlet or supply conduit 4 for liquid containing fibers and mixed with air or gas which conduit within the tank widens towards the discharge end as shown at 5. The portion 5 of the conduit 4 is substantially vertical so that the liquid to be treated is supplied to the tank in an upward current. In order to prevent a sudden change of the movement direction of the particles nearest to the wall of the inlet pipe, the upper edge of the pipe may be provided with a horizontal flange or collar 51.

From the upper portion of the tank there extends a conduit 6 with a regulating valve 7 through which conduit the fiber mass risen in the tank is sucked off by a vacuum-liquid-pump (not shown in this figure). This pump keeps up the liquid column in the tank. The quantity of the mass drawn off from the tank and consequently the concentration thereof is regulated by the valve 7.

The arrangement according to Figure 2 differs from that one shown in Figure 1 therein that the reservoir 2 is dispensed with and the tank 1, tapering also with its lower end, is connected directly to the discharge conduit 3.

The embodiments above described are shown diagrammatically while Figure 3 shows a practical embodiment of the invention. In this embodiment the conduit 4 with an open end projects down into the reservoir 2 which has substantially smaller dimensions than the tank 1 which rests on a suitable frame 10. The lower end of the tube 4 can be extended by a sleeve 11 which is displaceable along the tube. Said end of the tube 4 can be shut off by means of a valve comprising a vertically movable plate or disc 12. The upper, widened portion 5, 51 of the conduit 4 has the shape of a retarding nozzle. The liquid space of the reservoir 2 by a conduit 13 is connected with a reservoir 14 in which the airing of the liquid, entering through a conduit 15, takes place. The airing can be effected by compressed air or, as in this case, by an injector device 16.

The liquid containing the fibers is supplied to the injector through a conduit 17 and sucks in air through a conduit 18. Foam formed within the reservoir 14 is also drawn in by the injector through a conduit 19. The air spaces of the reservoirs 2 and 14 stand in connection with each other by a conduit 20 through which foam is sucked from the reservoir 2. The discharge conduit 3 from the tank 1 projects down into a reservoir 21 serving as water-trap. By elevating or lowering of the water level in this reservoir the suction lift for the pump 22 in the conduit 6 can be regulated. Through the conduit 3ª the clarified water escapes. Of the valves 7 and 7ª in the conduit 6 the former is used for the regulation of the mass drawn off while the shutting of the apparatus is effected by the valve 7ª.

Prior to the starting of the apparatus the valves 12 and 23 are shut off, which latter valve 23 is provided in the conduit 3. The valves 7 and 7ª are opened whereupon the apparatus is filled with water for which purpose a particular conduit 24 may be provided. After the apparatus thus being filled the pump 22, which keeps the water column in the tank 1 up, is started and the valves 12 and 23 are opened. The liquid then runs from the reservoir 14 to the reservoir 2 and through the pipe 4 up into the tank 1, where the fibers with air adhered thereto move up to the outlet at 6 and the clarified water over the edge of the flange or collar 5 through the bottom of the tank 1 is conducted out through the pipe 3.

As above mentioned, instead of air another suitable gas may be introduced into the liquid which is to be freed from the fibers.

The carrying out of the method is not limited to apparatus of the construction above described but any other suitable arrangement may be employed therefor.

What I claim is:—

1. A method for the recovery of fibers from liquids consisting in combination, the introduction of the liquid mixed with gas into a tank in an upwardly directed current and the maintaining of a reduced pressure within the tank, whereby the fibers by adhering gas bubbles are lifted up to the surface of the liquid from which they are then separated.

2. A method as claimed in claim 1 wherein the fibers lifted up to the surface of the liquid are sucked off from the tank.

3. A method for the recovery of fibers from liquids comprising the introduction of the liquid mixed with gas into a tank, the maintaining of a reduced pressure within said tank by a pump so that the fibers by adhering gas bubbles are lifted up to the surface of the liquid wherefrom they are sucked off from the tank by said pump.

In witness whereof I have hereunto set my hand.

ADOLF MAGNUS RUPERT KARLSTRÖM.